United States Patent [19]

Grossman

[11] 4,259,196

[45] Mar. 31, 1981

[54] ASBESTOS-FREE COMPRESSION MOLDING COMPOSITIONS FOR THERMAL AND ELECTRICAL INSULATORS

[75] Inventor: Harry R. Grossman, Meriden, Conn.

[73] Assignee: Meriden Molded Plastics, Inc., Meriden, Conn.

[21] Appl. No.: 55,627

[22] Filed: Jul. 9, 1979

[51] Int. Cl.³ .................... C04B 43/00; H01B 3/02
[52] U.S. Cl. .................... 252/62; 106/58; 106/73.5; 106/286.3; 106/286.6; 200/144 C
[58] Field of Search .................... 252/62, 63.2, 63.5; 106/286.3, 286.6, 73.5, 58; 200/144 C

[56] References Cited

U.S. PATENT DOCUMENTS

| | | | |
|---|---|---|---|
| 2,366,485 | 1/1945 | Brink et al. | 106/286.6 |
| 2,687,967 | 8/1954 | Yedlick et al. | 106/73.5 |
| 2,864,919 | 12/1958 | Stringfellow | 200/144 C |
| 3,322,549 | 5/1967 | Abolins et al. | 106/286.6 X |
| 3,383,230 | 5/1968 | Streib et al. | 106/286.6 X |
| 3,403,038 | 9/1968 | Abolins et al. | 106/69 X |
| 3,511,674 | 5/1970 | Harris et al. | 106/85 |

FOREIGN PATENT DOCUMENTS 2364872  5/1978  France .................... 252/63.2

*Primary Examiner*—Harris A. Pitlick
*Attorney, Agent, or Firm*—St. Onge, Steward, Johnston, Reens & Noë

[57] ABSTRACT

Asbestos-free compression molding compositions suitable for thermal and electrical insulator products are disclosed. The compositions comprise mixtures of calcium magnesium ferro silicate particulate material in predominating amount, in combination with phosphoric acid. When combined into intimate admixture and molded in a heated die press, the compositions cure as a hard, strong, dense product having good heat and electrical resistance properties.

4 Claims, No Drawings

ASBESTOS-FREE COMPRESSION MOLDING COMPOSITIONS FOR THERMAL AND ELECTRICAL INSULATORS

BACKGROUND OF THE INVENTION

1. Field of the Invention

The present invention relates to inorganic silicate compositions useful for compression molding of dense, hard products having high degree of thermal and electrical resistance. A particular field of interest is that of molding electrical insulator products, such as switch bases, arc chutes, and similar components of electrical control or distribution apparatus.

2. Description of the Prior Art

It has long been common practice to employ asbestos based compositions for molding of products of the type just mentioned, owing to excellent thermal and electrical resistance properties of commercially available forms of asbestos. These asbestos compositions comprise one component of a multicomponent mix containing other materials, such as magnesia, to form a somewhat fibrous mix that is mixed with phosphoric acid to provide a molding composition. It is necessary that the mix have good "pot" life; that is, that it be capable of a reasonable period of storage under ambient conditions after completion of the mixing process without acquiring a set or otherwise becoming degraded before it can be put into molds and compressed. Although the molding process is referred to as "cold molding", generally low heat is supplied to the molds during the process to cure the product before demolding. Post molding cure, as by placing the molded parts in suitable ovens under controlled temperature, is commonly employed to develop the ultimate strength and hardness desired. These asbestos-based products have served quite adequately from a functional standpoint, but the presence of asbestos fiber is objectionable from an environmental standpoint.

SUMMARY OF THE INVENTION

The embodiments of the invention described in detail hereinafter serve to illustrate ways to reduce environmental objections heretofore encountered in molding compositions for products of the type under consideration. In general it is an object of the invention to provide molding compositions which are as free as possible of the objections arising from use of fibrous asbestos in their make-up. It is a concommitant objective to provide compression molding compositions of the type discussed which retain the functional advantages of the asbestos containing compositions. These objectives and the improvements afforded by this invention will be more fully understood from the following discussion of specific molding compositions incorporating the novel aspects.

DETAILED DESCRIPTION OF THE PREFERRED EMBODIMENTS

EXAMPLE 1

A dry mix is prepared consisting of commercial (200 mesh) wollastonite and (200 mesh) olivine in a ratio of 1 pound of the former to approximately 2.2 pounds of olivine. Wollastonite is supplied commercially by Interpace Corporation, Parsippany, N.J. and olivine by Asbury Graphite Mills, Inc., Asbury, N.J. The approximate chemical analysis of the respective materials is given as follows by the suppliers:

|  | Wollastonite | Olivine |
| --- | --- | --- |
| $SiO_2$ | 50.90% | 39–43% |
| CaO | 46.90 | — |
| FeO | 0.55 |  |
| $Fe_2O_3$ | — | 4–6 |
| $Al_2O_3$ | 0.25 | 2–4 |
| MnO | 0.10 |  |
| MgO | 0.10 | 46–50 |
| $TiO_2$ | 0.05 |  |
| L.O.I. | 0.90 | 2–3 (as $CO_2$ + $H_2O$) |

The measured amounts of wollastonite and olivine are thoroughly mixed in dry form in a Sigma blade or other rotating blade mixer for several minutes to achieve uniformity. Concentrated (75%) phosphoric acid is then added in a ratio of about 1.3 pounds to approximately 3.2 pounds of the dry mixed powder of the previous step. This composition is thoroughly mixed to a mushy consistency and then dumped from the mixer.

A predetermined volume of the mix, which is dependent upon the size of the product to be molded, is placed in the cavity of a heated compression mold. In this case the product is a standard switch insulator part known as an arc chute, roughly rectangular in shape, being about 9 inches long, 2 inches wide and ¼ to 7/16 inch in thickness which varies in different parts of the product. The molding press capacity will vary with the size of the part but for the arc chute described above, a clamping pressure of about 3 tons is required. The mold is closed to compress the molding composition into close conformation with the mold surfaces, and is maintained closed for a cure interval adequate to achieve a required preliminary hardness or aging of the molded part. In this example, the cure time is approximately 3 minutes after which the mold is opened and the molded piece removed. The piece is typically then subjected to a post bake in an oven to complete the curing process. The part is then ready for final dressing or finishing and packing for shipment. The product has a hard, dense, fine grain surface of the type desired for electrical or thermal insulator purposes.

EXAMPLE 2

The same procedure as that of Example 1 is followed, but the proportioning of the ingredients in the molding composition is modified to provide about 2.6 pounds of olivine to 1 pound of wollastonite and about 1.03 pounds of phosphoric acid (75%). Again a dense, hard molded part results when this composition is placed in the molding press. However, this mix is more exothermic than that of Example 1 and for applications such as electric arc chute production appears to be less desirable.

EXAMPLE 3

A mix is prepared consisting of approximately of 5 pounds of "Kaowool Bulk D" (Babcock & Wilcox, Refractories Division, August, Ga.) replacing the wollastonite, and about 2.5 pounds (400 mesh) of olivine together with 1700 ml of concentrated phosphoric (75%) acid. In this case about 150 ml of water is also added in the mixer with the dry ice. Parts molded of this composition show fair strength (as tested by breaking off a corner of the molded product), but excess liquid in the composition is apparently present as it is expelled from the mold during the molding process. In spite of the excess liquid, the composition does not flow as well as the prior mixes when placed in the mold cavity.

EXAMPLE 4

A modification is made in the composition of Example 3, wherein the mix prepared is the same as before except for the further inclusion of about 3 pounds of wollastonite. This results in a molding composition of better flow properties when placed in the mold cavity and better strength of the molded part.

EXAMPLE 5

The molding composition of Example 4 is further modified by the addition of about 2 pounds more of wollastonite (approximately 5 pounds total). This change again gives improvement, in that the mix flows better in the mold. Further improvement in breaking strength is also noted for finished products molded of this mix.

Examples 3, 4 and 5 are representative of a mixture incorporating "Kaowool Bulk D" in place of or in addition to wollastonite. A further example of the basic 3-component mix (olivine-wollastonite-phosphoric acid) is illustrated by the following.

EXAMPLE 6

A mix is prepared consisting of about 3 pounds of wollastonite, 1 pounds of olivine (200 mesh) and 650 ml of concentrated (75%) phosphoric acid. This produces a molding mix that is more exothermic than that of Example 1 and consequently has a shorter "pot" life but may be useful for some applications such as small knob-and-tube type electrical insulators or heat resistant pads or bases for supporting hot implements or appliances.

Although specific embodiments of the present invention have been described in detail above, it is to be understood that these are for purposes of illustration only. Modifications may be made to the described embodiments of the invention by those skilled in the art for adapting the novel compositions to particular applications.

What is claimed is:

1. An asbestos-free composition moldable under heat and pressure to form dense, hard products having good thermal and electrical resistance, said compositions comprising mixtures of calcium magnesium ferro silicate based particulate material in predominant amount consisting of olivine and wollastonite, in combination with phosphoric acid.

2. A molding composition as defined in claim 1, wherein the mixture comprises said components being present in the proportion of about 2.2 pounds of olivine, about 1 pound of wollastonite and about 1.3 pounds of concentrated (75%) phosphoric acid.

3. A molding composition as defined in claim 1, wherein the mixture comprises said components being present in the proportion of about 2.6 pounds of olivine, about 1 pound of wollastonite and about 1.03 pounds of concentrated (75%) phosphoric acid.

4. A molding composition as defined in claim 1, wherein the mixture comprises said components being present in the proportion of about 1 pound of olivine, 3 pounds of wollastonite and 650 ml of concentrated (75%) phosphoric acid.

* * * * *